US011914084B2

(12) United States Patent
Lloyd et al.

(10) Patent No.: US 11,914,084 B2
(45) Date of Patent: Feb. 27, 2024

(54) RAPID FIELD TESTING OF RADIOACTIVITY LEVELS OF NATURALLY OCCURRING RADIOACTIVE MATERIALS IN OIL WASTE

(71) Applicant: Field Water Testing, LLC, Bountiful, UT (US)

(72) Inventors: Christopher Lloyd, West Valley City, UT (US); Andrew Duncan, Logan, UT (US)

(73) Assignee: Field Water Testing, LLC, Bountiful, UT (US)

( * ) Notice: Subject to any disclaimer, the term of this patent is extended or adjusted under 35 U.S.C. 154(b) by 105 days.

(21) Appl. No.: 17/707,729

(22) Filed: Mar. 29, 2022

(65) Prior Publication Data
US 2022/0317318 A1   Oct. 6, 2022

Related U.S. Application Data

(60) Provisional application No. 63/168,159, filed on Mar. 30, 2021.

(51) Int. Cl.
*G01T 1/167* (2006.01)
*G01T 1/40* (2006.01)
*G01N 1/40* (2006.01)

(52) U.S. Cl.
CPC ............... *G01T 1/167* (2013.01); *G01N 1/40* (2013.01)

(58) Field of Classification Search
CPC .................................. G01T 1/167; G01N 1/40
See application file for complete search history.

(56) References Cited

U.S. PATENT DOCUMENTS 5,819,771 A * 10/1998 Tate .......................... B09C 1/02
134/104.4

* cited by examiner

*Primary Examiner* — David P Porta
*Assistant Examiner* — Fani Polyzos Boosalis
(74) *Attorney, Agent, or Firm* — Kunzler Bean & Adamson

(57) ABSTRACT

For determining whether oil waste at a field testing site is exempt from selected naturally occurring radioactive material (NORM) waste regulations, a measurement apparatus including a detection module that determine radioactivity counts per minute for an oil waste sample is utilized. The measurement apparatus includes an analysis module that uses a first nonlinear transfer function to determine a mass for the oil waste based on a volume of solids determined via BS&W testing. The analysis module uses a second nonlinear transfer function to determine a maximum radioactivity level for the sample which is then normalized to picoCuries/g. The normalized maximum radioactivity level per gram is compared to a NORM exemption level for a selected region and communicated to entities at the field-testing site and optionally to other entities. A system and a method perform the functions of the measurement apparatus.

20 Claims, 9 Drawing Sheets

RAPID FIELD TESTING OF RADIOACTIVITY LEVELS OF NATURALLY OCCURRING RADIOACTIVE MATERIALS IN OIL WASTE

CROSS-REFERENCE TO RELATED APPLICATIONS

This application claims priority to U.S. Provisional Patent Application No. 63/168,159 titled "Method and Measurement apparatus for Screening Aqueous Solutions and Solids for Elevated Levels of Naturally Occurring Radioactive Material (NORM)" filed Mar. 30, 2021, which is hereby incorporated by reference in its entirety to the extent legally allowable.

FIELD

The subject matter disclosed herein relates to rapid field testing of radioactivity levels of naturally occurring radioactive materials in oil waste and more particularly relates to measurement apparatuses, methods, and systems for rapid field testing of radioactivity levels of naturally occurring radioactive materials in oil waste.

BACKGROUND

Naturally occurring radioactive material (NORM) arises from radionuclides which occur at typically low concentrations in the Earth's crust and are due primarily from the decay products of uranium and thorium. These elements can be inadvertently concentrated by deposition in waste solids resulting from the recovery of oil and gas. Additionally, there are other industrial or treatment processes that concentrate naturally occurring radionuclides resulting in what some term Technologically Enhanced Naturally Occurring Radioactive Material (TENORM). NORM and TENORM (collectively referred to herein as NORM) can pose a risk to human health in circumstances where radionuclide activities exceed regulatory limits. Radiation survey meters are used to quantify dose which is useful to determine exposure to personnel (survey) but this does not quantitate the concentration of Naturally Occurring Radioactive Material in the waste solids.

Existing methods for quantitating per unit mass activity such as simple quantification of total alpha and beta activity on a specified amount of solid sample or gamma ray spectroscopy incorporating assumptions about the equilibrium of gamma-active nuclides may require sending the waste solids to a laboratory where analysis may require an extended period of time. However, measurement apparatuses, methods, and systems suitable for field testing of radioactivity levels of naturally occurring radioactive materials in oil waste such as those of the present disclosure are not found

BRIEF SUMMARY

A measurement apparatus is disclosed for determining whether oil waste at a field testing site selected from an oil transport vehicle, a water treatment facility, or a waste treatment facility, is exempt from selected naturally occurring radioactive material (NORM) waste regulations applicable for a selected region. The measurement apparatus includes a detection module comprising a shielded chamber with multiple radiation detectors configured to detect and store a count of disintegrations occurring per predetermined unit of time in an oil waste sample taken from the field testing site. The measurement apparatus also includes a measurement controller that includes an input interface configured for entering into the measurement apparatus a value for a percentage of oil waste solids for a sample of the oil waste taken at the field testing site and for initiating a radioactivity count. The measurement controller includes an analysis module configured to: determine, using a first nonlinear transfer function, an estimated mass of the oil waste solids for the sample from the percentage of solids entered via the input interface; and to determine, using a second nonlinear transfer function, an estimated maximum radioactivity level; and to further determine a normalized maximum radioactivity level per mass unit. The measurement controller further includes a waste status module configured to communicate a waste status comprising a NORM exemption status to an entity at the field testing site in response to determining that the normalized maximum radioactivity level per mass unit of the oil waste solids for the sample falls below a NORM waste exemption level for the selected region. At least a portion of said modules comprise one or more of hardware circuits, programmable hardware circuits and executable code, the executable code stored on one or more computer readable storage media.

A system for determining whether oil waste at a field testing site selected from an oil waste transport vehicle, water treatment facility, or waste treatment facility, is exempt from naturally occurring radioactive material (NORM) waste regulations applicable for a selected region is disclosed. The system further includes one or more B&W tubes, and a centrifuge for separating oil waste solids from other oil waste components. In some examples, the system includes an oil transport vehicle that serves as the field testing site. In certain examples, the oil transport vehicle is selected from an oil tanker truck, an oil tanker ship, and a railroad tanker car. A method is disclosed that performs the functions of the measurement apparatus and/or other system components.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not, therefore, to be considered to be limiting of scope, the embodiments will be described and explained with additional specificity and detail through the use of the accompanying drawings, in which:

FIG. 8 is a schematic block diagram illustrating a system and method for rapidly sampling and characterizing radionuclides from wastewater, according to one or more aspects of the present disclosure; and.

DETAILED DESCRIPTION

Figure 1:
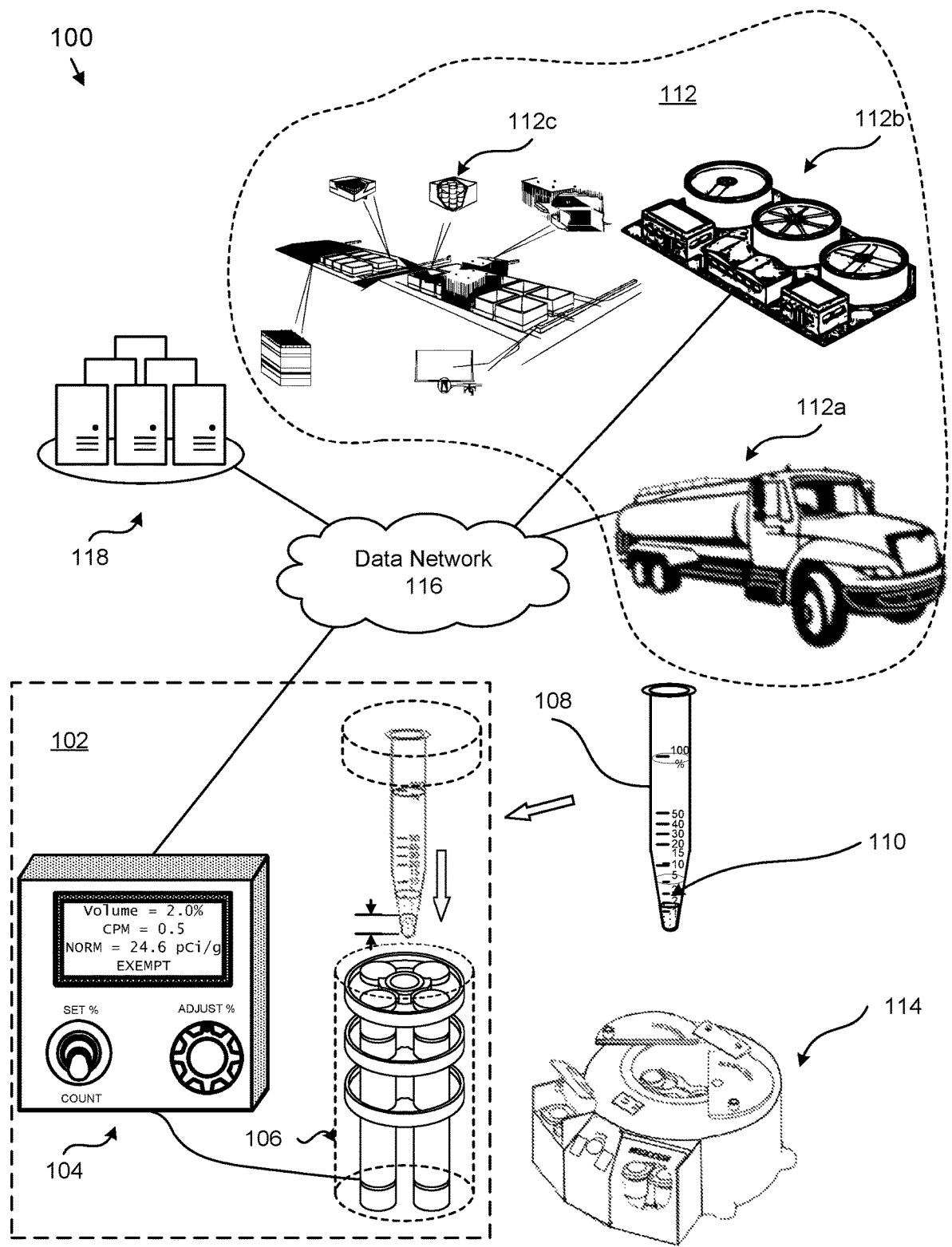
FIG. 1 is a schematic block diagram illustrating a system for rapid field testing of radioactivity levels of naturally occurring radioactive materials in oil waste, according to one or more aspects of the present disclosure.

As will be appreciated by one skilled in the art, aspects of the disclosure may be implemented as a system, method or program product. Accordingly, aspects or implementations may take the form of an entirely hardware implementation, an entirely software implementation (including firmware, resident software, micro-code, etc.) or an implementation combining software and hardware aspects that may all generally be referred to herein as a "circuit," "module," "controller," or "system." Furthermore, aspects of the disclosed subject matter may take the form of a program product implemented in one or more computer readable storage devices storing machine-readable code, computer readable code, and/or program code, referred hereafter as code. The storage devices may be tangible, non-transitory, and/or non-transmission. The storage devices may not embody signals. In a certain implementation, the storage devices only employ signals for accessing code.

Certain of the functional units described in this specification have been labeled as modules or controllers, in order to more particularly emphasize the implementation options that may be used. For example, some functions of a module or a controller may be implemented as a hardware circuit comprising custom VLSI circuits or gate arrays, off-the-shelf semiconductors such as logic chips, transistors, or other discrete components. A module or controller may also be implemented in programmable hardware devices such as field-programmable gate arrays, programmable array logic, programmable logic devices or the like.

Various modules or controllers may also be implemented in part or in whole, in code and/or software for execution by various types of processors. An identified controller or module of code may, for instance, comprise one or more physical or logical blocks of executable code which may, for instance, be organized as an object, procedure, or function. Nevertheless, the executables of an identified controller or module need not be physically located together but may comprise disparate instructions stored in different locations which, when joined logically together, comprise the module and achieve the stated purpose for the controller or module.

Indeed, a controller or a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a controller, module or portions thereof are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, measurement apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, measurement apparatus, or device.

Code for carrying out operations for some implementations may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one aspect," "an aspect," or similar language means that a particular feature, structure, or characteristic described in connection with the aspect is included in at least one implementation. Thus, appearances of the phrases "in one implementation," "in an implementation," and similar language throughout this specification may, but do not necessarily, all refer to the same implementation, but mean "one or more but not all implementations" unless expressly specified otherwise. The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise.

Furthermore, the described features, structures, or characteristics of the aspects or implementations may be combined in any suitable manner. In the following description, numerous specific details are provided, such as examples of programming, software modules, user selections, network transactions, database queries, database structures, hardware modules, hardware circuits, hardware chips, etc., to provide a thorough understanding of aspects and implementations. One skilled in the relevant art will recognize, however, that an implementation may be practiced without one or more of the specific details, or with other methods, components, materials, and so forth. In other instances, well-known structures, materials, or operations are not shown or described in detail to avoid obscuring aspects of the implementation.

Aspects of the disclosed implementations are described below with reference to schematic flowchart diagrams and/or schematic block diagrams of methods, measurement apparatuses, systems, and program products according to examples. It will be understood that some blocks of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing measurement apparatus to produce a machine, such that the instructions, which execute via the processor of the computer or other programmable data processing measurement apparatus, create means for implementing the functions/acts specified in the schematic flowchart diagrams and/or schematic block diagrams block or blocks.

The schematic flowchart diagrams and/or schematic block diagrams in the Figures illustrate the architecture, functionality, and operation of possible implementations of measurement apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding aspects or implementations. Indeed, some arrows or other connectors may be used to indicate only the logical flow of the depicted example aspect. For instance, an arrow may indicate a waiting or monitoring period of unspecified duration between enumerated steps of the depicted example implementation. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Unless expressly noted or otherwise clear from context, like numbers refer to like elements in all figures, including alternate implementation involving like elements.

As used herein, a list using the conjunction of "and/or" includes any single item in the list or a combination of items in the list. For example, a list of A's, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single items in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B, and C.

The present disclosure describes various aspects and implementation of methods, systems, and measurement apparatuses for rapid field testing of radioactivity levels of naturally occurring radioactive materials in oil waste. Various examples of the described aspects address many of the drawbacks associated with existing methods for radioactivity testing of oil waste.

FIG. 1 is a schematic block diagram illustrating a system 100 for rapid field testing of radioactivity levels of naturally occurring radioactive materials in oil waste, according to one or more aspects of the present disclosure. The system 100 in various implementations includes one or more of a measurement apparatus 102 that includes a measurement controller 104 and a detection module 106, a calibrated sample tube 108 configured to contain an oil waste sample 110 taken from a field testing site 112 (such as for example, an oil waste transport vehicle 112a, a waste facility 112b, a water treatment facility 112c). The system 100 includes in certain examples, a waste separation device 114 (e.g., a truck mounted centrifuge). In some examples, the measurement controller 104 is configured to connect to a data network 116 which, in certain examples, may also be connected to portable electronic devices (e.g., GPS, cellphones, laptops, tablets) at the field testing site 112. The data network 116 is various examples is connected to remote computing resources 118 (such as servers, storage devices, cloud based computing resource, and the like).

The measurement apparatus 102, in various examples, includes a measurement controller 104 and a detection module 106. The measurement controller 104 is configured to input parameters about the oil sample (e.g., % solids). The measurement controller 104 is further configured to collect, digitize, and analyze signals emitted by NORM in the oil waste sample 110. Further details about the measurement apparatus 102 including the measurement controller 104 and the detection module 106 are described below with respect to FIGS. 2 and 3.

The sample tube 108 in one or more examples is specially calibrated for measuring basic sediment and waste (BS&W) in the oil and gas industry to quantitate the amount of water and sediment in a volume of oil or gas. Generally, when oil is transferred from a producer to a purchaser, the volume of sediment and water in crude oil must be determined because purchasers pay only for the volume of oil received and want to minimize the amount of sediment and water they must deal with. Accordingly, to prevent excessive amounts of sediment and water from being transferred, BS&W testing is performed at oil and gas production sites.

Oil and natural gas fields and extraction methods (drilling, fracking, etc.) often involve similar techniques and generation of wastewater and waste solids including NORM waste solid. Oil waste solids are generally recovered from oil when performing a BS&W test using a standard 12.5 milliliter (mL) BS&W tube. During this test, crude or waste oil is heated to 160 F and centrifuged at a pre-determined speed for three minutes; solids, water, paraffin and oil fractionate according to density and can be quantified using a graduate scale comprising calibrated percent of volume markings on the side of the centrifuge tube.

As an improvement over existing technologies, the authors of the subject matter of the present disclosure have develop unique apparatuses, systems, and method to also use the BS&W testing for performing certain aspects of rapid field testing of radioactivity levels of naturally occurring radioactive materials (NORM) in oil waste. NORM may be found in the solids fraction and therefore the % solids in a BS&W test is parameter that can be input under dirty and/or rugged field conditions into the measurement controller 104 where a transfer function based on oil waste mass calibration model can be used to rapidly estimate the mass of the oil waste solids as part of the NORM analysis disclosed herein.

Figure 2:
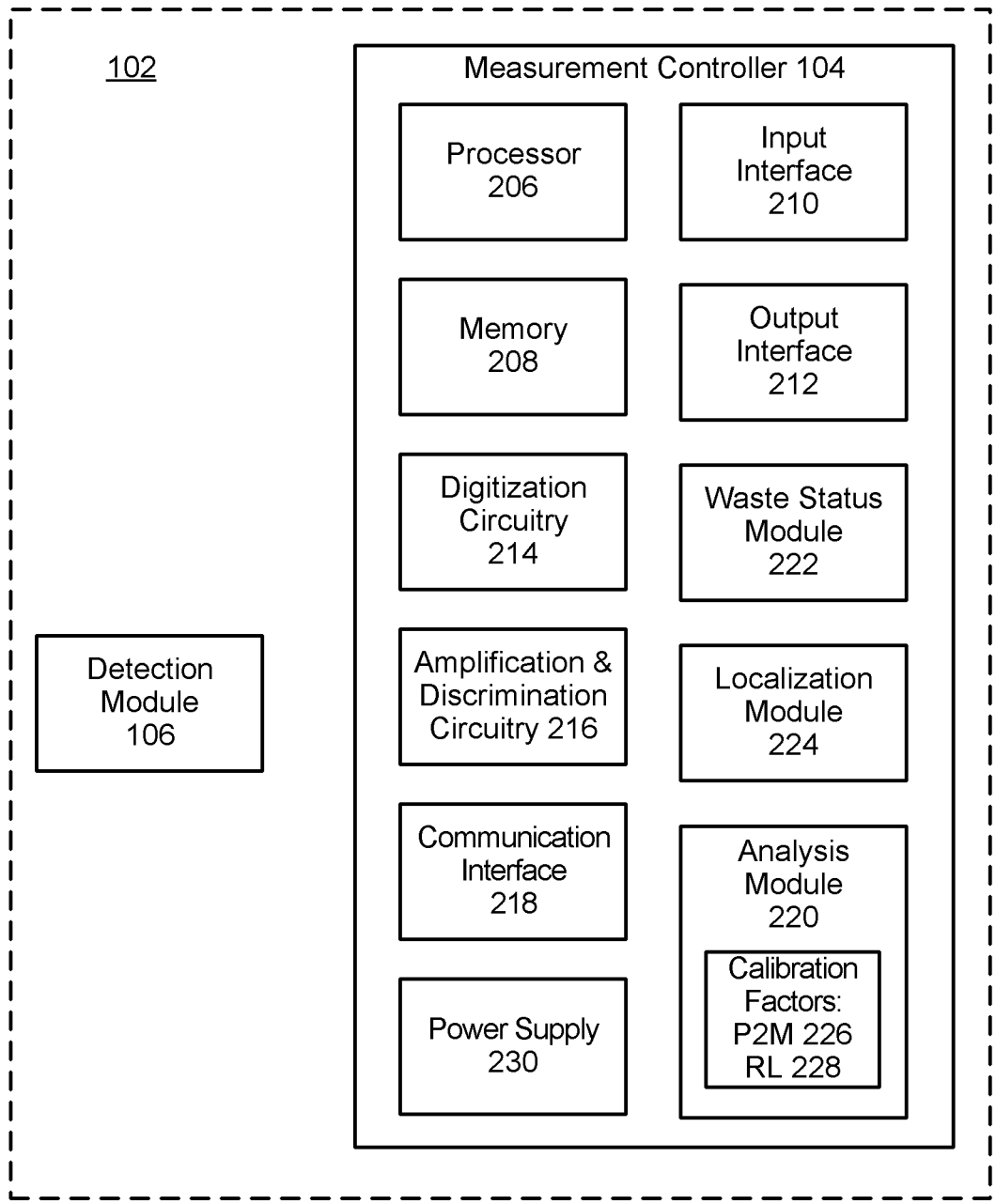
FIG. 2 is a schematic block diagram illustrating a measurement apparatus for rapid field testing of radioactivity levels of naturally occurring radioactive materials in oil waste, according to one or more aspects of the present disclosure.
Figure 3:
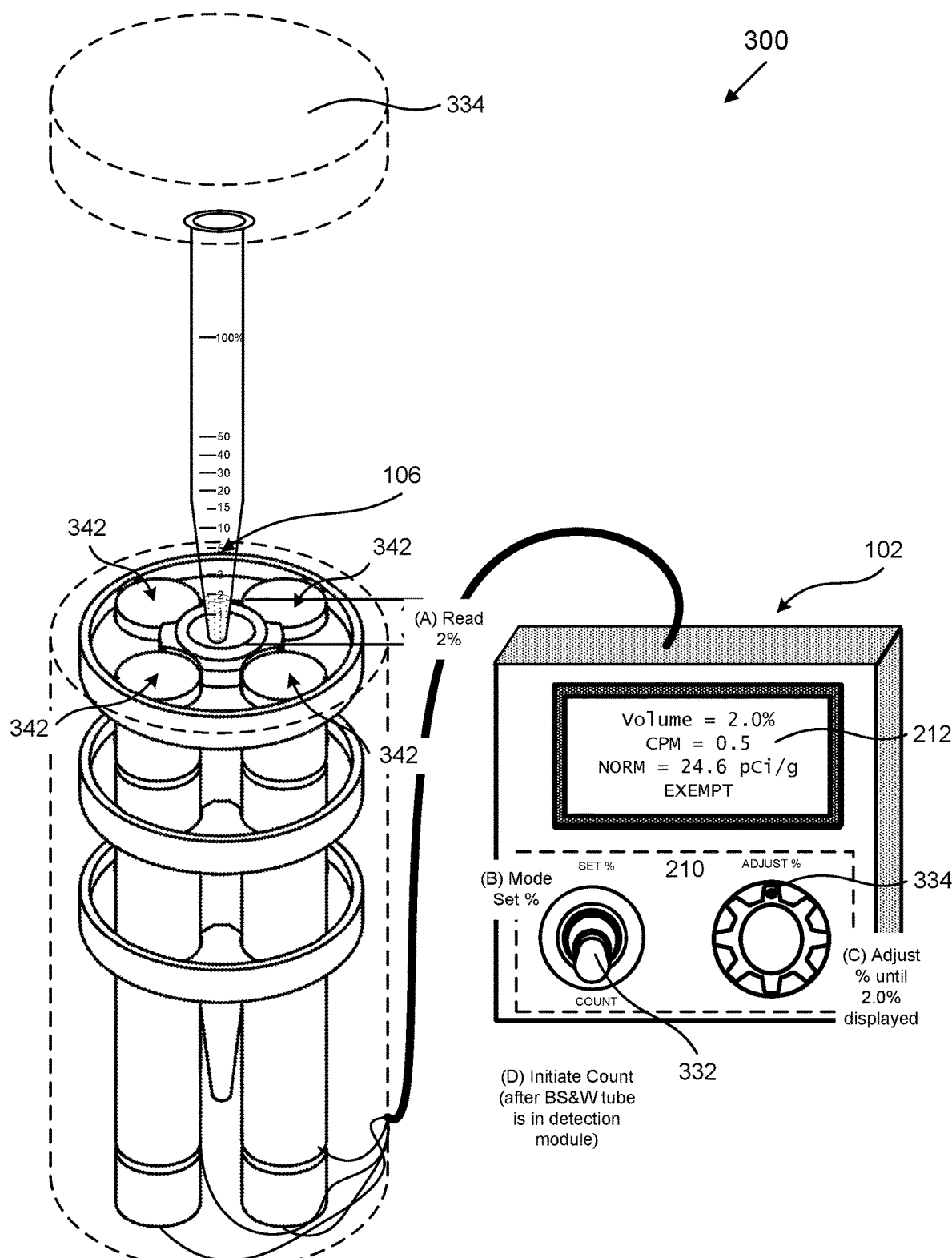
FIG. 3 is a diagram illustrating a measurement apparatus for rapid field testing of radioactivity levels of naturally occurring radioactive materials in oil waste, according to one or more aspects of the present disclosure.

Referring now to FIG. 2 and FIG. 3, FIG. 2 is a schematic block diagram illustrating an apparatus 200 for rapid field testing of radioactivity levels of naturally occurring radioactive materials in oil waste, according to one or more aspects of the present disclosure. FIG. 3 is a diagram illustrating an instance of the apparatus 200 for rapid field testing of radioactivity levels of naturally occurring radioactive materials in oil waste, according to one or more aspects of the present disclosure.

As depicted in FIG. 2, the apparatus 200 includes an instance of a measurement apparatus 102 with a detection module 106 and a measurement controller 104. In various examples, the measurement controller 104 includes one or more instances of a processor 206, a memory 208, an input interface 210, an output interface 212, and a power supply 230. In some examples, the measurement controller 104 includes amplification and discrimination circuitry 216 that operate on signals from the detection module 106 in response to detection of radioactivity (e.g., by disintegrations of radionuclides in NORM). In certain examples, the measurement controller 104 includes digitization circuitry 214 that converts signals from the amplification and discrimination circuitry 216 to digital data that can be accessed by the processor 206.

In various examples, the measurement controller 202 includes an analysis module 220 and a waste status module 222. In certain examples, the measurement controller 104 includes a localization module 224 and a communication interface 218. In various examples, the power supply 230 may be an internal power supply (e.g., with an internal battery) or may be adapted to regular power from a DC or AC power source at the field testing site 112.

In some examples, the input interface 210 is configured for entering into the measurement apparatus a value for a percentage of oil waste solids for a sample of the oil waste taken at the field testing site and for initiating a radioactivity count of the oil waste sample contained in the detection module 106. In certain examples, the input interface 210 is ruggedized so as to facilitate field site operation by an operator wearing safety gloves for oil and gas work.

For everyday use in ordinary environments, input interfaces such as touchscreen with keyboards and gesture controls may be suitable for selecting applications and entering data but such input interfaces may be troublesome for use at a field testing site 112 where the environment may be oily, dirty, cold, and subjected to significant noise and vibration. One significant type of field testing site 112 is an oil waste transport vehicle 112a such as a tanker truck.

Most oil and gas companies, due to the nature of their work, mandate that the safety gloves worn in their sites have at least an A5 cut resistance level, while certain tasks require an even higher cut resistance level A7 as specified by relevant standards (e.g., American National Standard For Hand Protection Classification ANSI/ISEA 105-2016) or corresponding levels by other standards bodies. The thickness needed for cut resistance may hinder precise finger movements such as pushing individual keys, swiping gesture, and similar input modalities. Likewise chemical and or fire resistance materials used in safety gloves may hinder capacitive finger based inputs such as used on touch screens.

As illustrated in FIG. 3, the measurement controller 202 may beneficially include an input interface 210 that is ruggedized so as to facilitate field site operation by an operator wearing safety gloves for oil and gas handling. In some examples, a mode control 332 (e.g., a toggle switch or a paddle switch) may facilitate simplified operation by an operator wearing safety gloves for oil and gas industry work. At one step, an operator wearing safety gloves may readily flip the mode control 332 to one position (e.g., up) to enter a mode where a control 334 (e.g., a knob or a dial) is used to set or enter a percentage of oil waste solids in the sample. For examples, if a level of oil waste solids is nearest to a 2% marking on the BS&W tube, after flipping the mode control 332 (e.g., switch) up to set the percentage solids, the operator may turn the control 334 until the corresponding portion of the output interface 212 displays the volume of oil waste solids at the correct percentage e.g., 2.0%.

With the correct percentage of oil waste solids entered into the measurement controller 104, the operator may place the filled BS&W tube 108 into the detection module 106 and cover the sample in the BS&W with a shielding lid 336. Shielding may be beneficial to minimize the potential radioactivity from the background and other sources thereby minimizing interference from sources that are not the sample.

In various examples, the detection module 106 includes a shielded chamber 340 with multiple Geiger-Müller tubes also referred to as G-M tubes 342, that are configured to detect disintegrations occurring per predetermined unit of time in an oil waste sample taken from the field testing site 112. Many existing Geiger counters have a single G-M tube, which may be suitable for general monitoring of radioactivity levels.

In contrast, the authors of the present disclosure have determined that number of G-M tubes 342 used in the detection module 106 has significance because it is beneficial to detect the as many decay events possible during a short period of time (e.g., one minute), especially when the amount of solids to be tested for NORM is small.

It is also beneficial to keep the relative position of the sample to the radiation detectors 343 (e.g., G-M tubes) constant and non-specific to a particular detector tube so that the number of disintegrations detected collective by the Geiger tubes can be reliably calibrated to a total activity from either a known source or from a sample of known activity.

In certain example, the multiple radiation detectors 342 are implemented as a selected number of Geiger-Müller (G-M) tubes 342 evenly distributed around and adjacent to the BS&W tube 108 containing the oil waste sample 110. Surprisingly to some, configurations with too many G-M tubes 342 reduces signal collection efficiency due to the increased distance between each G-M tube and the sample 110 and configurations with too few G-M tubes reduces the total possible number of gamma rays that can be collected thus making it difficult to achieve sufficiently reliable estimates of radioactivity levels when small amounts of NORM in oil waste solids are involved. In some examples, the selected number of G-M tubes 342 in the shielded chamber 340 is from 4 to 6 tubes.

In one or more examples, the measurement controller 104 includes an analysis module 220 that is configured to determine, using a first nonlinear transfer function, an estimated mass of the oil waste solids for the sample from the percentage of solids entered via the input interface. The analysis module 220 is also configured to determine, using a second nonlinear transfer function, an estimated maximum radioactivity level for the sample. The analysis module 220 is further configured to determine a normalized maximum radioactivity level per mass unit.

Although different oil and gas fields in different regions may have different sediment content with different densities, the authors of the present disclosure have determined an oil waste mass calibration model that is suitable to construct a transfer function for determining oil waste mass from BS&W solid percentage with remarkable consistency even where samples come from fields in different regions with significant geological/sedimentary differences.

In some examples, the first nonlinear transfer function is based on an oil waste mass calibration model expressible as $M=b2(POWS)^2+b1(POWS)$ where: output M is a mass (in grams) of the oil waste solids; $b_2$ and $b_1$ are percentage to mass (P2M) calibration factors for a combination of oil waste solids; and POWS is the percentage of oil waste solids determined by selecting a graduated marking on the BS&W tube nearest to a top level of the oil waste solids. In certain examples, the P2M calibration factors are within the following ranges: $0.84 \leq b1 \leq 0.094$; and $0.006 \leq b2 \leq 0.008$.

Likewise, although different oil and gas fields in different regions may have different NORM content with different levels of radioactivity, the authors of the present disclosure have determined a second nonlinear transfer function based on radioactivity level calibration model that is suitable for determining an estimated maximum radioactivity level for an oil waste sample 110 being tested.

In certain examples, the second nonlinear transfer function is based on a radioactivity level calibration model expressible as $R=c2(CPM)^2+c1(CPM)$ where: output R is a radioactivity level in picoCuries; $c_2$ and $c_1$ are radioactive level (RL) calibration factors for radioactive oil waste solids of the type being tested; and CPM is a detection count rate in counts per minute determined using the radiation detectors 342. In some examples, the RL calibration factors are within the following ranges: $9.3 \leq c1 \leq 10.9$; and $0.054 \leq c_2 \leq 0.064$.

Figure 4:
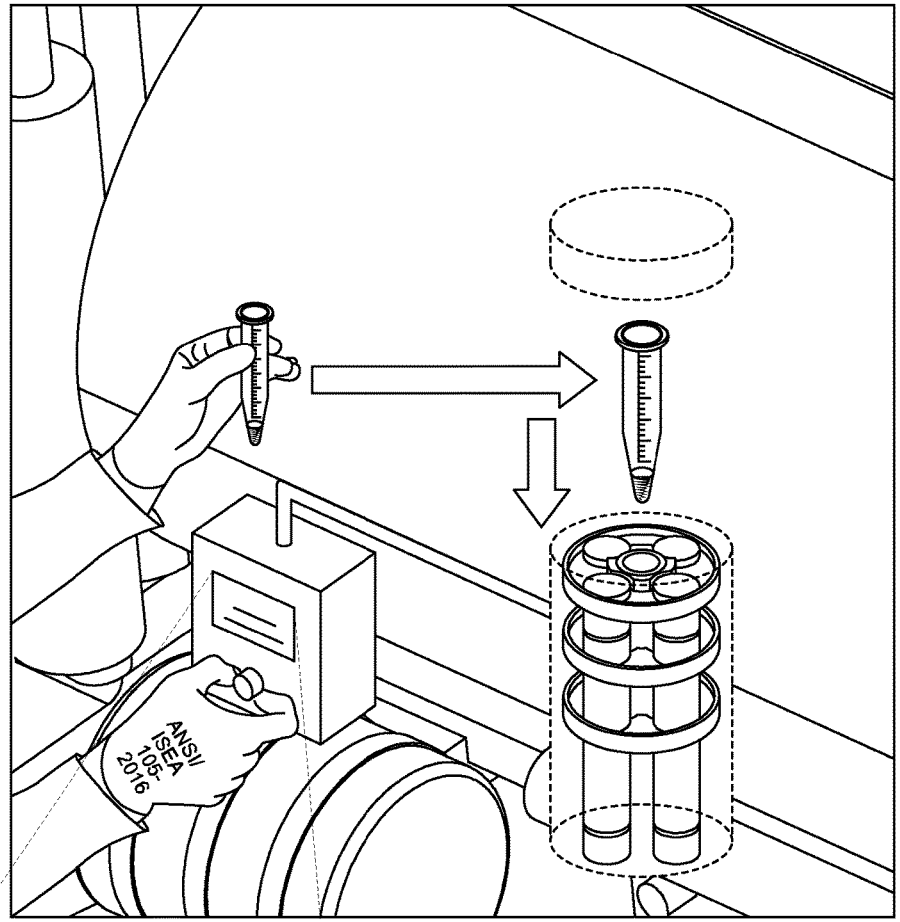
FIG. 4 is a diagram illustrating use examples for rapid field testing of radioactivity levels of naturally occurring radioactive materials in oil waste, according to one or more aspects of the present disclosure.

As illustrated in FIG. 4, in various examples, the measurement controller 104 further includes a waste status module 222 configured to communicate a waste status comprising a NORM exemption status to an entity at the field testing site in response to determining that the normalized maximum radioactivity level per mass unit of the oil waste solids for the sample falls below a NORM waste exemption level for the selected region.

To illustrate, in Example A the output interface 212 displays the volume of oil waste solids entered after reading the BS&W tube and the counts per minute (CPM) (e.g., as detected by the detection module 106 and as determined by the analysis module 220 using the first and second nonlinear transfer functions and the calibration factors 226, 228. Further, the output interface 212 displays as NORM in picoCuries per gram (pCi/g) the normalized maximum radioactivity level per mass unit of oil waste solid. The waste status module 222 communicate a waste status (e.g., a NORM exemption status) to an entity (such as an equipment operator) at the field testing site in response to determining that the normalized maximum radioactivity level per mass unit of the oil waste solids for the sample falls below a NORM waste exemption level for the selected region.

Different entities are responsible for ensuring compliance with the NORM regulations for different selected regions. For example, governmental entities such state or regional regulatory authorities may set NORM different NORM exemption levels such as 50 pCi/g or even lower levels such as 35 pCi/g. If a load of oil includes waste the has NORM levels that exceed the NORM exemption level, different procedures and safeguards for transport, treatment, or storage may be required. In contrast, if the normalized maximum radioactivity level per mass unit of the oil waste solids for the sample falls below a NORM waste exemption level for the selected region, then the special NORM transport, treatment, and storage requirements are not applied.

Other entities may be responsible for ensuring compliance with the NORM regulations for different selected regions such as for example private companies in the oil extraction, transport, storage, and waste treatment, as well as water treatment may be responsible for ensuring compliance with the NORM regulations imposed by government entities or self-imposed by the companies or industry groups.

In some examples, the measurement controller 104 further includes a localization module that sets the NORM exemption levels used by the waste status module based on one or more localization parameters selected from: region-specific NORM exemption levels, source location of the oil waste, destination location of the oil waste, information pertaining to one or more offsite entities responsible for ensuring compliance with the NORM regulations for the selected region, and combinations thereof.

In certain examples, the localization module may further adjust the calibration factors 226,228 used by the first and second nonlinear transfer functions based on adjusted calibration models suitable for the selected regions. In various examples, the localization parameters are updated via the data network 116 (e.g., a wireless network).

In various examples, the localization module 224 is configured to store the data generated for retrieval at a future time for use in producing reports, provide the information to a printer, or both. In some examples, the localization module 224 is configured to communicate one or more input and/or output values used to determine the waste status of the sample to an entity of the one or more offsite entities responsible for ensuring compliance with the NORM regulations for the selected region.

In some examples, the apparatuses, systems, and methods determine NORM exemption levels as an allowed combined quantity (in pCi/g) of Radium-226 and Radium-228, an excess of an allowed total radioactivity (in pCi/g), or both. In contrast to existing NORM tests where the amount of specific radionuclides are determined at a laboratory, taking a significant amount of time (for transport, analysis and reports), the apparatuses, systems, and methods disclosed herein may be configured to determine the NORM levels in picoCuries per gram primarily based on selected radionuclides such as Radium-226 and Radium-228 that are regulated in the selected region.

In various examples, the structures and function described as being included in the apparatus 200 are included as a system with certain components of the system 100 as described above with respect to FIG. 1. For example, in some implementations, the system 100 include an oil transport vehicle that serves as the field testing site 112. In some implementations, the oil transport vehicle is selected from an oil tanker truck, an oil tanker ship, and a railroad tanker car. In certain implementations, the system 100 includes a centrifuge for separating oil waste solids from other oil waste components; and one or more BS&W tubes. Various other combinations of components may be include in the system 100.

Figure 5:
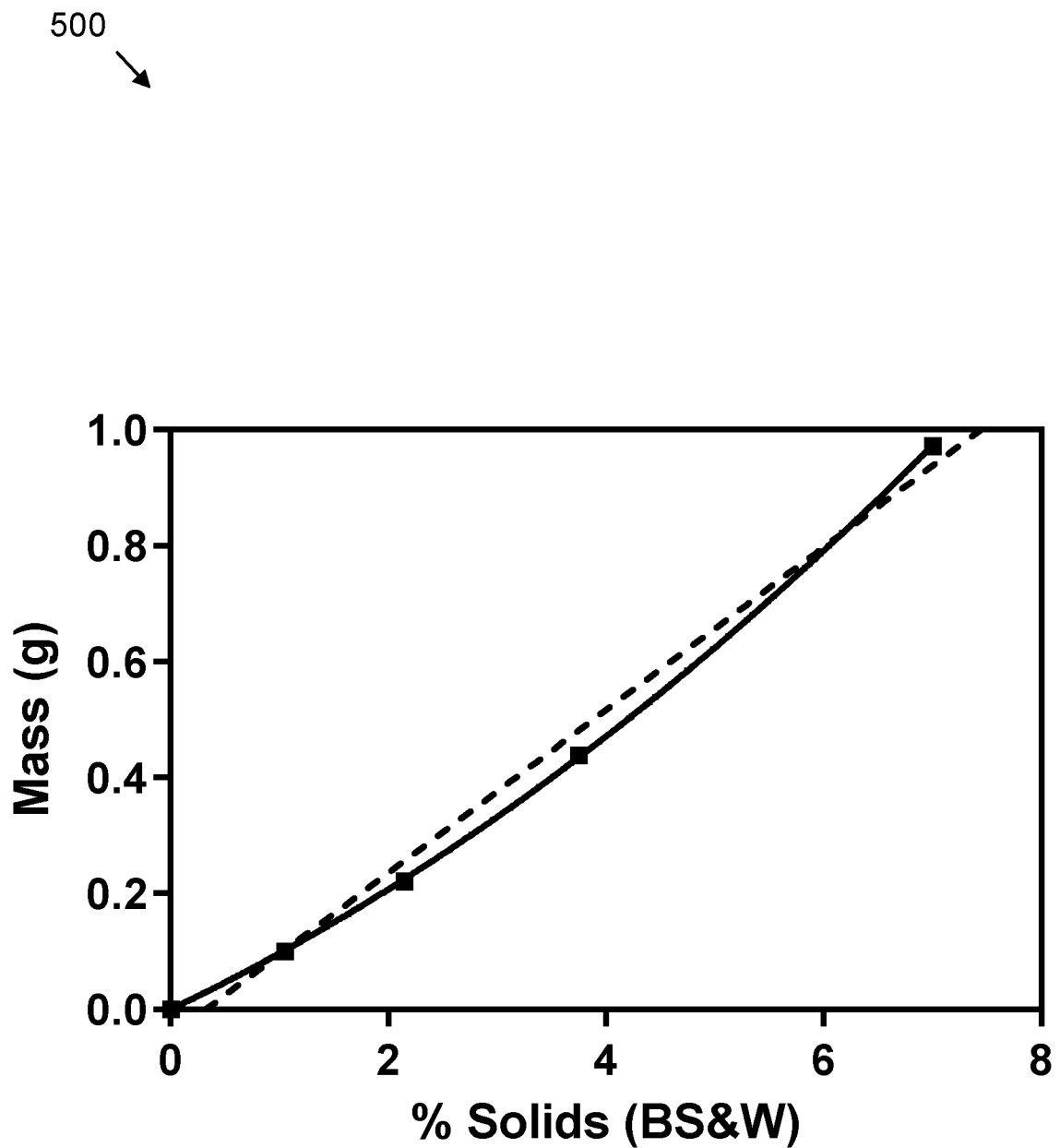
FIG. 5 is a diagram illustrating a first nonlinear transfer function based on an oil waste mass calibration model for rapidly determining mass of oil waste solids, according to one or more aspects of the present disclosure.

FIG. 5 is a diagram illustrating a graph 500 of a first nonlinear transfer function based on an oil waste mass calibration model for rapidly determining mass of oil waste solids, according to one or more aspects of the present disclosure.

In the example of FIG. 5, the points on the graph 500 are based on solid oilfield wastes containing elevated NORM that were collected from Texas, Wyoming and North Dakota and the solid fractions were collected under conditions used for BS&W testing. Varying amounts of each solid were collected using a 12.5 mL BS&W tube, the % volume was recorded and then dried, recovered and weighed. As described above, although the density of solids and/or radioactivity levels of collected oil waste solids sample for generating the calibration model varied (some samples were collected from the Permian Basin in Texas and other samples from North Dakota and Wyoming), the authors of the present disclosure were remarkably able to effectively apply the percentage to mass calibration model they developed to generate consistently similar results for different wastes from the tested regions.

Figure 6:
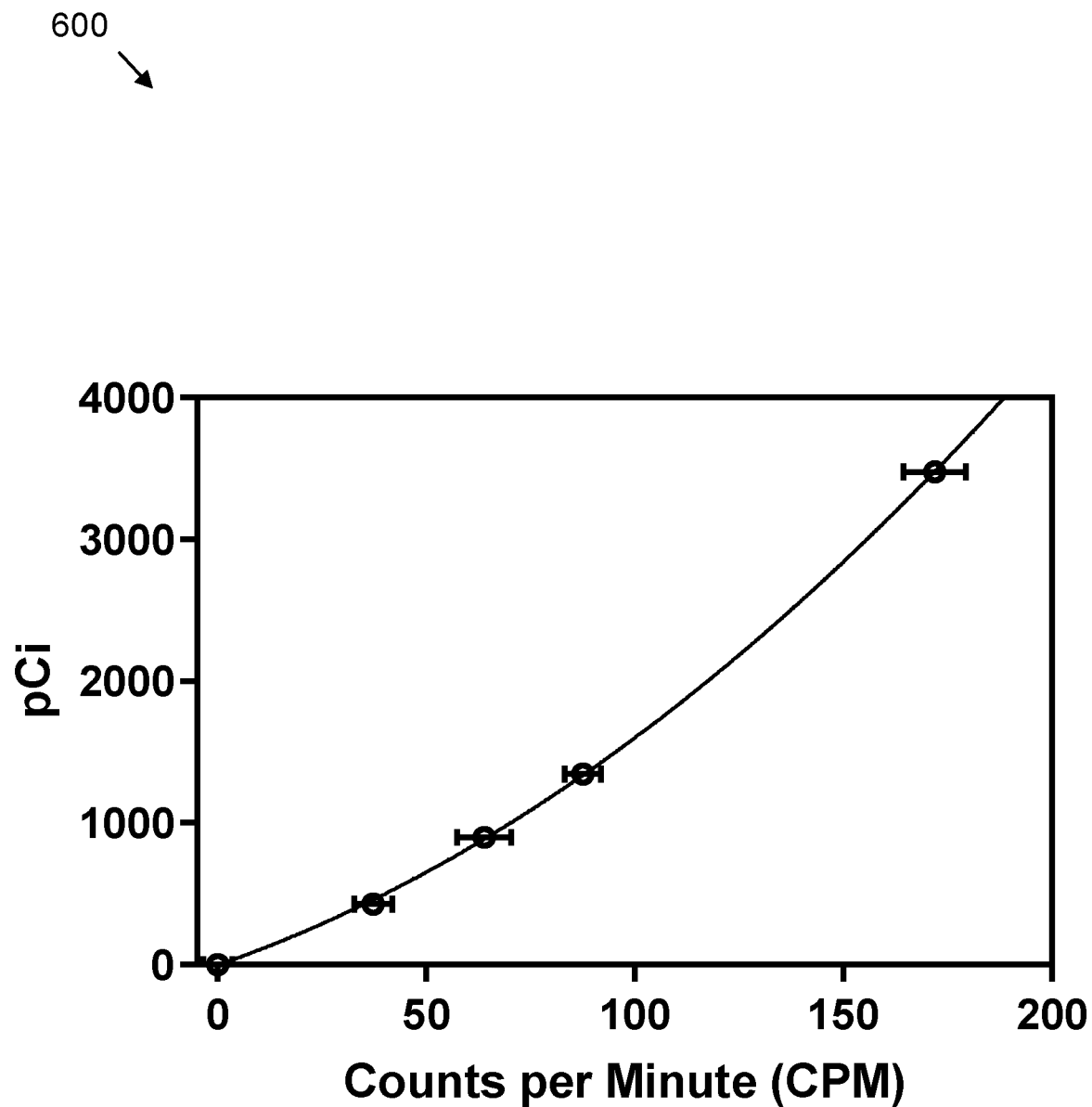
FIG. 6 is a diagram illustrating a second nonlinear transfer function based on a radioactivity level calibration model for rapidly determining a radioactivity of oil waste solids, according to one or more aspects of the present disclosure.

FIG. 6 is a diagram illustrating a graph 600 of a second nonlinear transfer function based on a radioactivity level calibration model for rapidly determining a radioactivity of oil waste solids, according to one or more aspects of the present disclosure. The graph 600 illustrates a transfer curve for determining activity (in pCi) of oilfield waste solids based on the measured counts per minute CPM values. The error bars show the variability of these measurements for 5 samples of the same calibrated solids. The inventors of the present disclosure have determined a second nonlinear transfer function based on a radioactivity level calibration model expressible as $R=c2(CPM)^2+c1(CPM)$ where: output R is a radioactivity level in picoCuries; c2 and c1 are radioactive level (RL) calibration factors for radioactive oil waste solids of the type being tested; and CPM is a detection count rate in counts per minute determined using the radiation detectors.

As explained above, the localization module may adjust the calibration factors for mass and/or radioactivity levels to confirm with NORM exemption levels for a selected region depending on the sources used for determining the radioactivity level calibration models.

Solid oilfield wastes which contained significantly elevated levels of NORM were collected from Texas and North Dakota and the solid fractions were collected under conditions used for BS&W testing. These solids were dried, homogenized and tested for NORM activity using a certified laboratory. Mixtures of known amounts of these solids with known amounts of silicon dioxide were used to generate calibration solids with known calculated activity. These samples were used to determine the number of CPM for 5 grams of sample in the shielded instrument described in the patent application to generate the total activity transfer function. The data collected using the sample from Texas the sample from North Dakota and a 50:50 mixture of these samples, was used to determine the appropriate radioactivity level calibration factors and the authors of the present disclosure were able to demonstrate remarkable similar results for samples from all regions.

Figure 7:
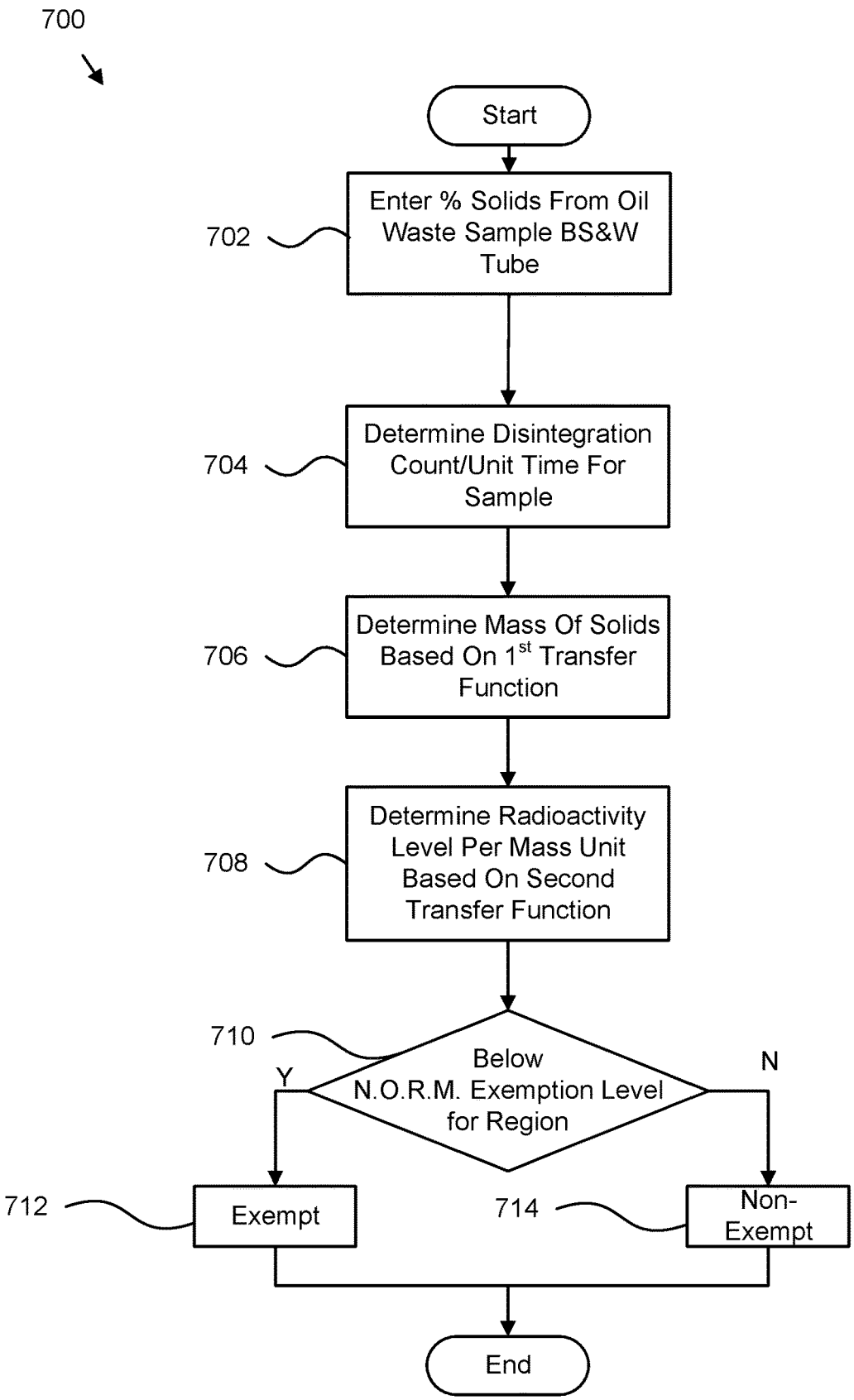
FIG. 7 is a schematic flowchart diagram illustrating a method for rapidly determining a radioactivity of oil waste solids, according to one or more aspects of the present disclosure.

FIG. 7 is a schematic flowchart diagram illustrating a method 700 for determining whether oil waste at a field testing site selected from an oil transport vehicle, a water treatment facility, or a waste treatment facility is exempt from naturally occurring radioactive material (NORM) waste regulations applicable for a selected region. In one or more examples, the method 700 begins and include determining 702 a percentage of oil waste solids for a sample of the oil waste substantially as described above with respect to FIG. 2, FIG. 3, and FIG. 4.

The method 700 continues and includes determining 704 a disintegration count per unit time for the sample substantially as described above with respect to FIG. 2, FIG. 3, and FIG. 4.

The method 700 continues and includes determining 706, based on the first transfer function, a mass of oil waste solid in the sample substantially as described above with respect to FIG. 2, FIG. 3, and FIG. 4.

The method 700 continues and includes determining 708, based on the output of the second transfer function, divided by the mass determined at 706, a radioactivity level per mass unit of the oil waste sample.

The method 700 continues and includes determining 710 whether the oil waste from which the sample was taken is exempt 712, in response to the normalized maximum radioactivity level in picoCuries per gram being below the NORM exemption level for the selected region or otherwise determining that the oil waste is not exempt 714.

In various examples, more detail method steps may be included in the method 700 as described above with respect to FIG. 2, FIG. 3, and FIG. 4.

For example, is some implementation the method 700 is a method for determining whether oil waste at a field testing site selected from an oil transport vehicle, a water treatment facility, or a waste treatment facility is exempt from naturally occurring radioactive material (NORM) waste regulations applicable for a selected region. The method 700 includes determining a percentage of oil waste solids for a sample of the oil waste; determining a disintegration count per unit time for the sample; determining a mass value for the oil waste solids using a first nonlinear transfer function based on an oil waste mass calibration model expressible as $M=b2(POWS)^2+b1(POWS)$ where: output M is a mass (in grams) of the oil waste solids; $b_2$ and $b_1$ are percentage to mass (P2M) calibration factors for a combination of oil waste solids; and POWS is the percentage of oil waste solids determined by selecting a graduated marking on the BS&W tube nearest to a top level of the oil waste solids.

In some examples, the method 700 also includes determining a maximum radioactivity level using a second nonlinear transfer function based on a radioactivity level calibration model expressible as $R=c_2(CPM)^2+c1(CPM)$ where: output R is a radioactivity level in picoCuries; $c_2$ and c1 are radioactive level (RL) calibration factors for a selected type of radioactive waste solids; and CPM is a detection count rate in counts per minute. In certain examples, the method 700 includes determining a normalized maximum radioactivity level per mass unit; and outputting at the field testing site a waste status that indicates that the oil waste is exempt from NORM regulations applicable for the selected region in response to determining that the normalized maximum radioactivity level per mass unit R/M falls below an applicable NORM exemption level for the selected region.

In various examples, the P2M calibration factors are within the following ranges: $0.84 \leq b1 \leq 0.094$; and $0.006 \leq b2 \leq 0.008$, and the RL calibration factors are within the following ranges: $9.3 \leq c1 \leq 10.9$; and $0.054 \leq c_2 \leq 0.064$.

In some examples, the method 700 further includes communicating one or more values used in determine the waste status of the sample to one or more offsite entities responsible for ensuring compliance with the NORM regulations for the selected region.

Figure 8:
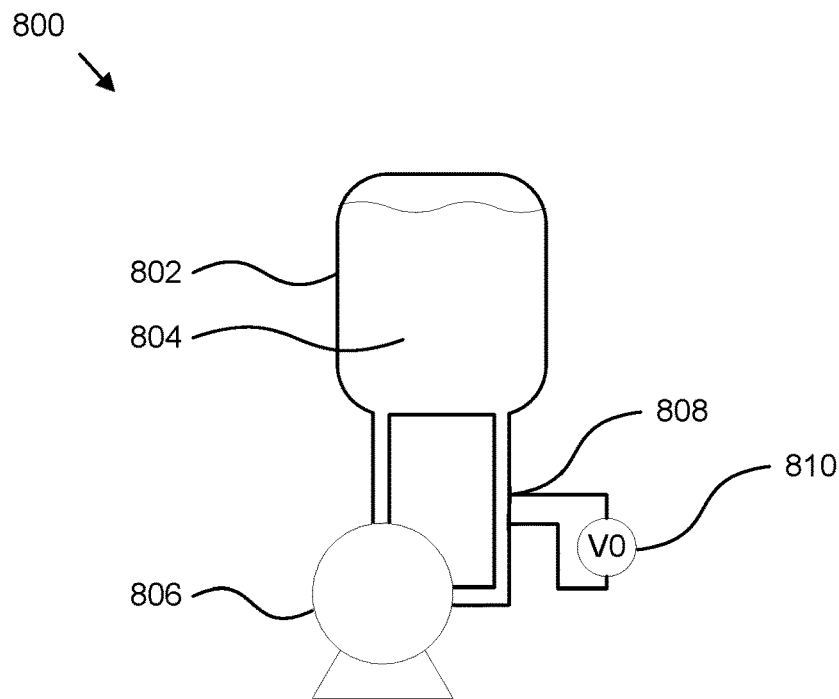
Figure 8:
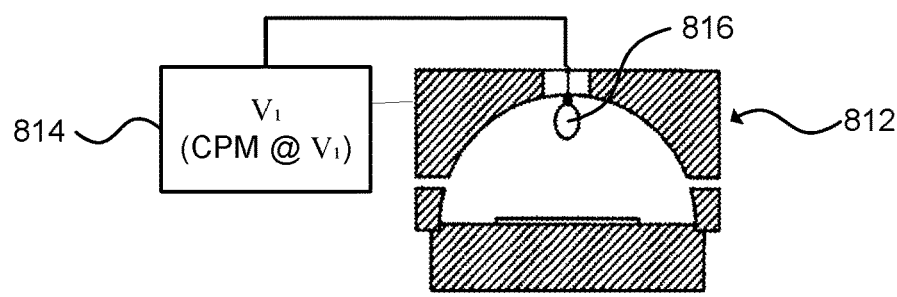
Figure 8:
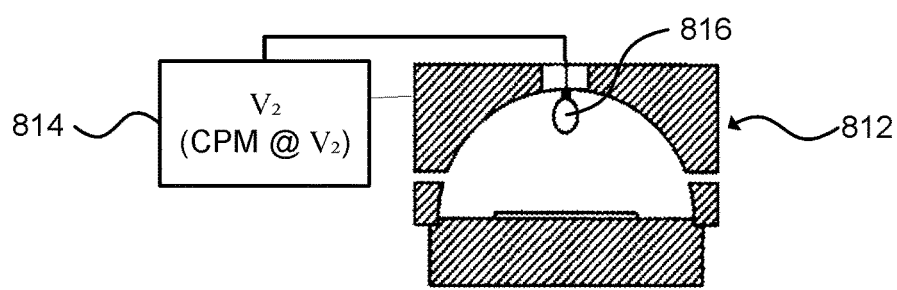

FIG. 8 is a schematic block diagram illustrating a system 800 and a method that may be performed using the system for rapidly sampling and characterizing radionuclides from wastewater, according to one or more aspects of the present disclosure.

Although the majority of the NORM waste in raw wastewater is typically found in the solids, it is sometimes desirable to determine the NORM content of the water before recycling or disposal in an injection well. The system 800 includes a sample container 802 that is configured to hold a sample of wastewater 804 that may include radionuclides. The system 800 includes a pump 806 that is configured to pump the wastewater 804 so that it is in electrical contact with a collection electrode 808 to which a voltage source 810 is configured to apply a voltage V0 to perform a process similar to electrodeposition. The collection electrode 808 is configured to concentrate the NORM isotopes along with electrochemically similar cations in a thin layer on a surface of the collection electrode 808 that is exposed to the wastewater 804. The thin layer of isotopes on the collection electrode 808 is removed.

The system 800 further includes a proportional counter 812 that is configured to measure ionizing radiation. The proportional counter 812 is electrically attached to a measurement circuit 814 (e.g., a spectrum analyzer) that is configured to generate a voltage so that any decay events that create ions can be detectable by the measurement circuit 814. The proportional counter 812 is also flushed with gas that selected to enhance production of ions by the charged anode and circuit (506). Depending on the design of the proportional counter 812, alpha radiation events can be optimized at a specific voltage ($V_1$) while beta and gamma radiation is minimized. By increasing the voltage ($V_2$) the alpha and beta radiation events can be detected while minimizing gamma events; this method can be used to determine the total alpha (using $V_1$) and total beta (using the difference between $V_2$ and $V_1$) of the collected sample. The system 800 further includes circuitry (e.g., a processor) configured to calculate the maximum concentrations of Ra-226 (alpha emitter) and Ra-228 (beta emitter) from the samples by comparing the total activities against calibrated standards collected and measured using the same conditions.

Figure 9:
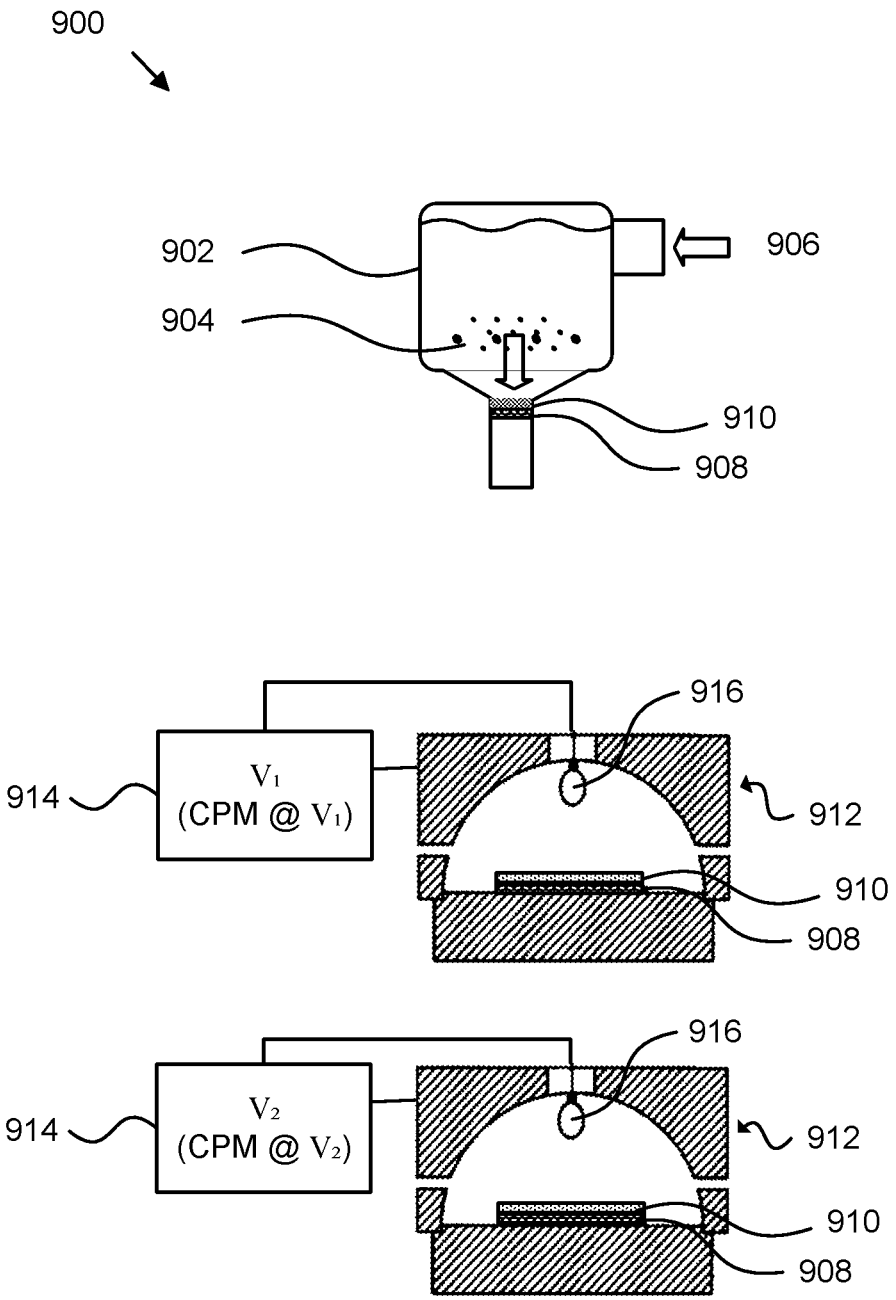
FIG. 9 is a schematic block diagram a system and method for rapidly sampling and characterizing radionuclides from wastewater sampling by precipitation or co-precipitation, according to one or more aspects of the present disclosure.

FIG. 9 is a schematic block diagram a system 900 and corresponding method for rapidly sampling and characterizing radionuclides from wastewater sampling by precipitation or co-precipitation, according to one or more aspects of the present disclosure.

The system 900 includes sample of wastewater 902 to which a selected precipitant 906 (e.g., sulfates) is mixed to cause NORM solids to precipitate for collection and concentration through filtration on a filter 908 which allows the water to pass but retains a thin layer of solids 910. The filter 908 containing the thin layer of solids 910 is placed in a proportional counter as shown in FIG. 9, specifically where the proportional counter is electrically attached to a circuit (e.g., spectrum analyzer) 914 that is capable of generating a voltage so that any decay events that create ions can be detectable by said electronics; the proportional counter 912 is also flushed with gas that permits the optimal production of ions by the charged anode 916 and circuit 914 (e.g., spectrum analyzer). Depending on the design of the proportional counter 912, alpha radiation events can be optimized at a specific voltage ($V_1$) while beta and gamma radiation is minimized. By increasing the voltage ($V_2$) the alpha and beta radiation events can be detected while minimizing gamma events; this method can be used to determine the total alpha (using $V_1$) and total beta (using the difference between $V_2$ and $V_1$) of the collected sample, thus calculating the maximum concentrations of Ra-226 (alpha emitter) and Ra-228 (beta emitter) from the samples by comparison of the total activities against calibrated standards collected and measured using the same conditions. It will be appreciated by those skilled in the art that the sample can also be produced through evaporation, concentration from solutions by the use of selective ion exchange resins or other similar physical processes.

By concentrating radionuclides from brine, water or wastewater solutions through the use of (1) concentration by evaporation, (2) precipitation (primarily through the use of sulfates or sulfuric acid) or co-precipitation with other heavy element sulfates and filtration, (3) electrodeposition, or (4) concentration from solutions by the use of selective ion exchange resins. In the case of precipitation and filtration the mass of the resulting solids can be determined via gravimetric analysis. Gravimetric analysis for mass determination can also be used for traditionally dried samples (heat or vacuum drying). Electrodeposition and concentration through selective ion-binding resins masses can be calculated through modeling or beneficially through calibration using known samples with known water properties.

Quantification of specific radionuclides can be accomplished through scintillation detectors where said detectors exhibit enough resolution to differentiate between the energies of various decays between isotopes. Quantitation of alpha-emitting isotopes can be accomplished by using a calibrated gas-flow internal proportional counter; alpha and beta-emitting isotopes can also be counted by utilizing a calibrated gas-flow internal proportional counter. It is possible to use the same gas-flow proportional counter with different voltage biases subsequently on the same sample to count both alpha then alpha plus beta isotopes. Use of a proportional counter can additionally be conducted using gasses optimized for detection of alpha decays only then subsequently conducted using different gas mixes, pressures or flow rates to optimize detection of alpha and beta radiation emissions.

Ra-226 and Ra-228 can be estimated by calculating the difference between different voltage biases using this methodology once the concentrating or drying method and instrument are calibrated using representative samples. Alternately, liquid scintillation can be used to detect the alpha or beta emissions from a sample cocktail to accomplish quantitation of isotopes. Calibration of the proportional counters can be accomplished using similar methods outlined by Method 903.1 (EPA 1980), 903.0 (EPA 1976 and EPA 1980), Method 304 (APHA) and Method D 2560-90 (ASTM 1994) for Ra-226; calibration for Ra-228 can be similarly achieved using procedures analogous to Method 904.0 (EPA 1980).

Calibration of total gross alpha and beta can be performed in a manner similar to EPA Method 900.0 (EPA 1980).

Example implementations may be practiced in other specific forms. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A measurement apparatus for determining whether oil waste at a field testing site selected from an oil transport vehicle, a water treatment facility, or a waste treatment facility, is exempt from selected naturally occurring radioactive material (NORM) waste regulations applicable for a selected region, the measurement apparatus comprising:
a detection module comprising a shielded chamber with a plurality of radiation detectors configured to detect and communicate signals indicating a count of disintegrations occurring per predetermined unit of time in an oil waste sample taken from the field testing site;
a measurement controller comprising:
circuitry configured to receive the signals from the detection module indicating the count of disintegrations;
a processor;
an input interface configured for entering into the measurement apparatus a value for a percentage of oil waste solids for a sample of the oil waste taken at the field testing site and for initiating a radioactivity count;
an analysis module configured to:
determine, using a first nonlinear transfer function, an estimated mass of the oil waste solids for the sample from the percentage of solids entered via the input interface;
determine, using a second nonlinear transfer function, an estimated maximum radioactivity level; and
determine a normalized maximum radioactivity level per mass unit; and
a waste status module configured to communicate a waste status comprising a NORM exemption status to an entity at the field testing site in response to determining that the normalized maximum radioactivity level per mass unit of the oil waste solids for the sample falls below a NORM waste exemption level for the selected region,
wherein at least a portion of the waste status module and the analysis module comprise one or more of hardware circuits, programmable hardware circuits, and executable code, the executable code stored on a memory accessible by the processor.

2. The measurement apparatus of claim 1, wherein the input interface is ruggedized so as to facilitate field site operation by an operator wearing safety gloves for oil and gas industry work.

3. The measurement apparatus of claim 1, wherein the percentage of oil waste solids of the sample is indicated by a Basic Sediment and Water (BS&W) tube marking after wastewater is collected from a mixed tank or truck and placed in a BS&W tube that is heated and centrifuged to separate water, oil, and sediment.

4. The measurement apparatus of claim 3, wherein the BS&W tube is a standard 12.5 mL BS&W tube.

5. The measurement apparatus of claim 1, wherein the plurality of radiation detectors includes a selected number of Geiger-Müller (G-M) tubes evenly distributed around and adjacent to the BS&W tube containing the sample.

6. The measurement apparatus of claim 5, wherein the selected number of G-M tubes in the shielded chamber is from 4 to 6 tubes.

7. The measurement apparatus of claim 1, wherein the normalized maximum radioactivity level per mass unit of the oil waste solids is determined as a ratio R/M where R is a radioactivity level output value of the second nonlinear transfer function and M is a mass output value of the first nonlinear transfer function.

8. The measurement apparatus of claim 1, wherein:
the first nonlinear transfer function is based on an oil waste mass calibration model expressible as $M=b_2(POWS)^2+b_1(POWS)$ where:
output M is a mass (in grams) of the oil waste solids;
$b_2$ and $b_1$ are percentage to mass (P2M) calibration factors for a combination of oil waste solids; and
POWS is the percentage of oil waste solids determined by selecting a graduated marking on the BS&W tube nearest to a top level of the oil waste solids; and
the second nonlinear transfer function is based on a radioactivity level calibration model expressible as $R=c_2(CPM)^2+c_1(CPM)$ where:
output R is a radioactivity level in picoCuries;
$c_2$ and $c_1$ are radioactive level (RL) calibration factors for radioactive oil waste solids of the type being tested; and
CPM is a detection count rate in counts per minute determined using the radiation detectors.

9. The measurement apparatus of claim 8, wherein:
the P2M calibration factors are within the following ranges:
$0.84 \leq b_1 \leq 0.094$; and
$0.006 \leq b_2 \leq 0.008$, and
the RL calibration factors are within the following ranges:
$9.3 \leq c_1 \leq 10.9$; and
$0.054 \leq c_2 \leq 0.064$.

10. The measurement apparatus of claim 1, further comprising a localization module that sets the NORM exemption levels used by the waste status module based on one or more localization parameters selected from: region-specific NORM exemption levels, source location of the oil waste, destination location of the oil waste, information pertaining to one or more offsite entities responsible for ensuring compliance with the NORM regulations for the selected region, and combinations thereof.

11. The measurement apparatus of claim 10, wherein the localization parameters are updated via a wireless data network.

12. The measurement apparatus of claim 10, wherein the localization module communicates one or more input and/or output values used to determine the waste status of the sample to an entity of the one or more offsite entities responsible for ensuring compliance with the NORM regulations for the selected region.

13. A system for determining whether oil waste at a field testing site selected from an oil waste transport vehicle, water treatment facility, or waste treatment facility, is exempt from naturally occurring radioactive material (NORM) waste regulations applicable for a selected region, the system comprising:

a centrifuge for separating oil waste solids from other oil waste components;
one or more BS&W tubes; and
a measurement apparatus comprising:
   a detection module comprising a shielded chamber with a plurality of radiation detectors configured to detect and communicate signals indicating a count of disintegrations occurring per predetermined unit of time in an oil waste sample taken from the field testing site;
   circuitry configured to receive the signals from the detection module indicating the count of disintegrations;
   a processor;
   an input interface for entering into the measurement apparatus a value for a percentage of oil waste solids for a sample of the oil waste taken at the field testing site;
   an analysis module configured to:
      determine an estimated mass of the solids for the sample from the percentage of solids using a first nonlinear transfer function,
      determine an estimated maximum radioactivity level using a second nonlinear transfer function, and
      determine a normalized maximum radioactivity level per mass unit; and
   a waste status module configured to communicate a waste status comprising a NORM exemption status to an entity at the field testing site in response to determining that the normalized maximum radioactivity level per mass unit of the oil waste solids for the sample falls below a NORM waste exemption level for the selected region,
   wherein at least a portion of the waste status module and the analysis module comprise one or more of hardware circuits, programmable hardware circuits and executable code, the executable code stored on a memory accessible by the processor.

14. The system of claim 13, further comprising an oil transport vehicle that serves as the field testing site.

15. The system of claim 14, wherein the oil transport vehicle is selected from an oil tanker truck, an oil tanker ship, and a railroad tanker car.

16. The system of claim 13, wherein the measurement apparatus further comprises a localization module that sets the NORM exemption levels used by the waste status module based on one or more localization parameters selected from: region-specific NORM exemption levels, source location of the oil waste, destination location of the oil waste, information pertaining to one or more offsite entities responsible for ensuring compliance with the NORM regulations for the selected region, and combinations thereof.

17. The system of claim 16, wherein the localization parameters are updated via a wireless data network.

18. A method for determining whether oil waste at a field testing site selected from an oil transport vehicle, a water treatment facility, or a waste treatment facility is exempt from naturally occurring radioactive material (NORM) waste regulations applicable for a selected region, the method comprising:
   determining a percentage of oil waste solids for a sample of the oil waste;
   determining a disintegration count per unit time for the sample;
   determining a mass value for the oil waste solids using a first nonlinear transfer function based on an oil waste mass calibration model expressible as $M=b_2(POWS)^2+b_1(POWS)$ where:
      output M is a mass (in grams) of the oil waste solids;
      $b_2$ and $b_1$ are percentage to mass (P2M) calibration factors for a combination of oil waste solids; and
      POWS is the percentage of oil waste solids determined by selecting a graduated marking on the BS&W tube nearest to a top level of the oil waste solids;
   determining a maximum radioactivity level using a second nonlinear transfer function based on a radioactivity level calibration model expressible as $R=c_2(CPM)^2+c_1(CPM)$ where:
      output R is a radioactivity level in picoCuries;
      $c_2$ and $c_1$ are radioactive level (RL) calibration factors for a selected type of radioactive waste solids; and
      CPM is a detection count rate in counts per minute;
   determining a normalized maximum radioactivity level per mass unit; and
   outputting at the field testing site a waste status that indicates that the oil waste is exempt from NORM regulations applicable for the selected region in response to determining that the normalized maximum radioactivity level per mass unit R/M falls below an applicable NORM exemption level for the selected region.

19. The method of claim 18, wherein:
the P2M calibration factors are within the following ranges:
   $0.84 \leq b_1 \leq 0.094$; and
   $0.006 \leq b_2 \leq 0.008$, and
the RL calibration factors are within the following ranges:
   $9.3 \leq c_1 \leq 10.9$; and
   $0.054 \leq c_2 \leq 0.064$.

20. The method of claim 18, further comprising communicating one or more values used in determine the waste status of the sample to one or more offsite entities responsible for ensuring compliance with the NORM regulations for the selected region.

* * * * *